United States Patent [19]

Ball et al.

[11] Patent Number: 4,967,778
[45] Date of Patent: Nov. 6, 1990

[54] BUTTERFLY VALVE APPARATUS AND METHOD

[75] Inventors: Larry K. Ball, Chandler; Marshall U. Hines, Scottsdale, both of Ariz.

[73] Assignee: Allied-Signal Inc., Morris Township, Morris County, N.J.

[21] Appl. No.: 422,354

[22] Filed: Oct. 16, 1989

[51] Int. Cl.⁵ ............................................. F16K 1/22
[52] U.S. Cl. .................................... 137/1; 251/218; 251/283; 251/305; 251/308
[58] Field of Search ................. 137/1; 251/215, 218, 251/227, 281, 283, 305, 308, 160

[56] References Cited

U.S. PATENT DOCUMENTS

| | | |
|---|---|---|
| 212,556 | 2/1879 | Johnson . |
| 443,326 | 12/1890 | Leverich . |
| 932,172 | 8/1909 | Porter et al. . |
| 965,322 | 7/1910 | Peterson . |
| 1,167,145 | 1/1916 | Baverey . |
| 1,328,565 | 1/1920 | Howard . |
| 1,541,047 | 6/1925 | Hart . |
| 1,744,798 | 1/1930 | Price . |
| 2,051,881 | 8/1936 | Mock . |
| 2,095,263 | 10/1937 | Moss . |
| 2,271,390 | 1/1942 | Dodson . |
| 2,796,082 | 6/1957 | Green . |
| 2,833,511 | 5/1958 | Fletcher . |
| 2,910,266 | 10/1959 | Condello et al. . |
| 3,008,685 | 11/1961 | Rudden . |
| 3,062,232 | 11/1962 | McGay . |
| 3,065,950 | 11/1962 | Goldberg ............................ 251/160 |
| 3,200,838 | 8/1965 | Sheaffer . |
| 3,298,659 | 1/1967 | Cupedo . |
| 3,344,808 | 10/1967 | Cary . |
| 3,400,907 | 9/1968 | Horn et al. . |
| 3,442,489 | 5/1969 | Cary et al. . |
| 3,516,640 | 6/1970 | Bryer et al. . |
| 3,545,486 | 12/1970 | Larson . |
| 3,675,681 | 7/1972 | Obermaler . |
| 3,677,297 | 7/1972 | Walton . |
| 3,794,288 | 2/1974 | Dolder et al. . |
| 3,960,177 | 6/1976 | Baumann . |
| 3,971,414 | 7/1976 | Illing .............................. 251/305 X |
| 3,982,725 | 9/1976 | Clark . |
| 3,993,096 | 11/1976 | Wilson . |
| 4,084,617 | 4/1978 | Happe . |
| 4,190,074 | 2/1980 | Mailliet et al. . |
| 4,313,592 | 2/1982 | Baas . |
| 4,367,861 | 1/1983 | Bray et al. . |
| 4,508,132 | 4/1985 | Mayfield, Jr. et al. . |
| 4,534,538 | 8/1985 | Buckley et al. . |
| 4,556,192 | 12/1985 | Ramisch . |
| 4,586,693 | 5/1986 | Tinner . |
| 4,706,706 | 11/1987 | Page et al. . |
| 4,712,768 | 12/1987 | Herr et al. . |

FOREIGN PATENT DOCUMENTS

| | | |
|---|---|---|
| 2821766 | 11/1979 | Fed. Rep. of Germany . |
| 1533073 | 11/1978 | United Kingdom . |

*Primary Examiner*—Robert G. Nilson
*Attorney, Agent, or Firm*—Terry L. Miller; James W. McFarland; Robert A. Walsh

[57] ABSTRACT

A butterfly valve includes a duct defining a fluid flow path and a plate-like valve member pivotal in the duct to in one position span and close the latter. The valve member is pivotal to a second position spanning the duct and extending parallel to the flow path to allow fluid flow therein. Means are provided for altering the effective area distribution of the valve member about its pivot axis to decrease the operating torque required by the inventive valve in comparison with conventional butterfly valves.

23 Claims, 3 Drawing Sheets

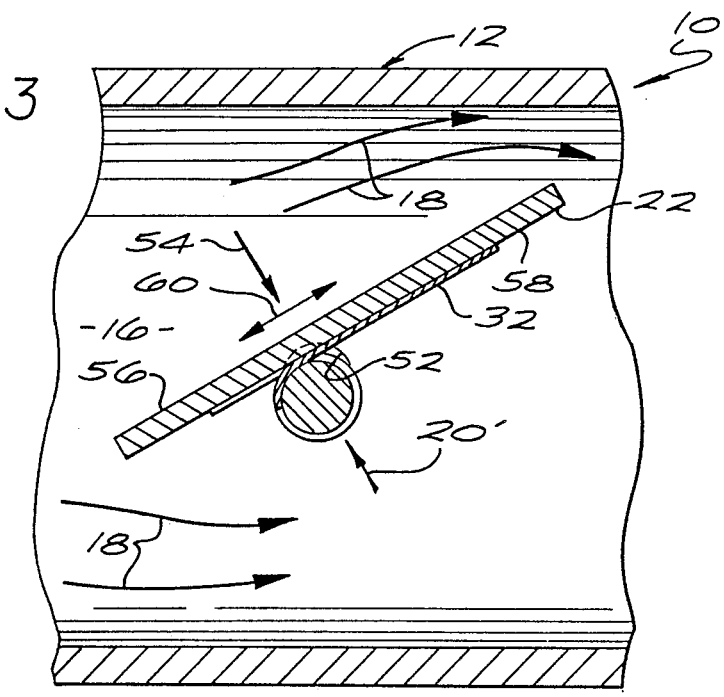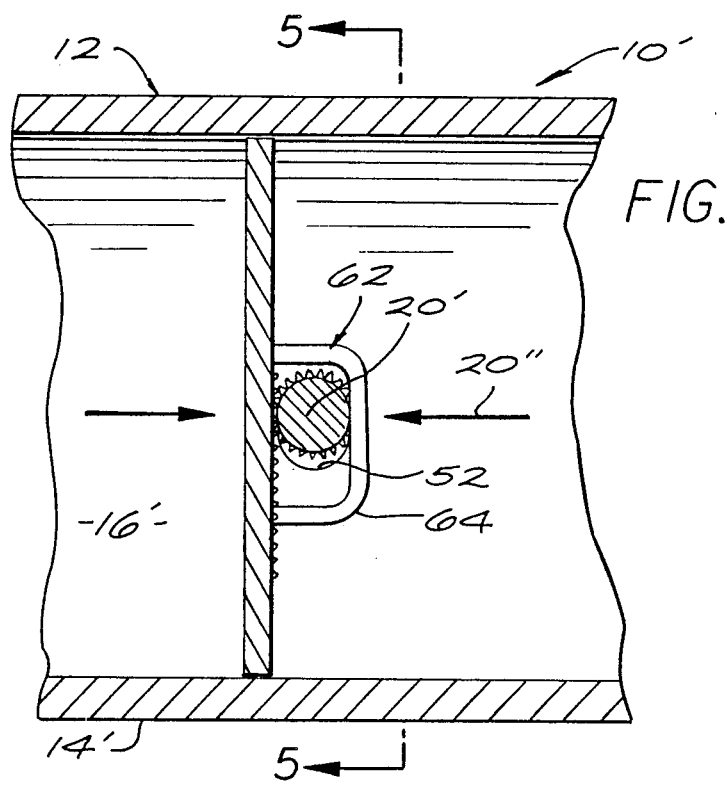

BUTTERFLY VALVE APPARATUS AND METHOD

BACKGROUND OF THE INVENTION

The coinventors named on this application are also coinventors on other related applications generally relating to butterfly valves (including Ser. Nos 374,897 filed 30 June 1989; and 395,234, filed 17 Aug. 1989; 422,210, filed 16 Oct. 1989; 422,380, filed 16 Oct. 1989; 422,487, filed 16 Oct. 1989; 426,921, filed 4 Oct. 1989; and 451,659, filed 15 Dec. 1989, all cofiled or copending with the present application, and all assigned to Allied-Signal, Inc.

The present invention relates generally to valve apparatus and methods. More particularly, the present invention relates to butterfly valve apparatus and methods wherein a duct defines a flow path for conveying a flow of fluid. A plate-like valve member is pivotally disposed in the duct about a transverse axis, and is conformal at its outer periphery to the internal wall shape of the duct. The valve member is pivotal between a first position transverse to the flow path and substantially sealingly engaging the duct wall to close fluid flow therein, and a second position spanning the flow path generally parallel therewith to allow and control the fluid flow therein.

A conventional butterfly valve is set forth by U.S. Pat. No. 3,971,414, issued 27 July 1976 to H. Illing. The '414 patent also discusses the general state of the butterfly valve art prior to the invention by Illing. According to the teaching of the '414 patent, the actuating torque required to rotate the valve member of a butterfly valve from its closed position to an open position may be reduced by utilizing an articulated valve member. That is, the plate-like butterfly valve member includes a leading wing and a trailing wing with respect to fluid flow. The leading wing of Illing's valve member is defined in part by a servo tab or spoiler tab which is carried by and pivotally movable relative to the remainder of the valve member. By pivoting the spoiler tab ahead of the valve member in the opening direction so as to point into the fluid flow, Illing changes the angulation and effective movement arm of the fluid pressure and flow forces on the spoiler tab. Illing hopes to reduce the total torque opposing opening of the valve member in comparison to previously known butterfly valves. The articulation of the spoiler tab is such that it pivots from an aligned position to move ahead of the valve member during most of the pivotal movement of the latter in the opening direction. During the last portion of the pivotal movement of the valve member to its fully open position, the servo tab reverses its relative pivotal movement and returns to an aligned position achieved when the valve member is fully open. In this way, the valve member and servo tab align with one another and with the fluid flow in the fully open position of the valve member.

A reduction in the operating torque required to move the valve member from its closed to its open position, such as assertedly achieved by the invention of Illing, has been a long-recognized need in the field of butterfly valves. Unfortunately, the invention of Illing as set forth in the '414 patent does not fully comprehend the usual design requirements for a butterfly valve, and has not enjoyed commercial acceptance, to the Applicants' knowledge.

It will be understood by those skilled in the pertinent art that the valve member of a conventional butterfly valve must ordinarily achieve a sealing tight fit with the walls of the duct. Ordinarily the plate-like butterfly valve member carries a seal member at the outer periphery thereof. This seal member, for example, a piston ring type, o-ring, or lip seal, is resiliently and sealingly engageable with the duct wall in the closed position of the valve member. Thus, it is conventional for the plate-like valve member to be circumferentially continuous, and to be skewed slightly relative to the pivot shaft supporting the valve member. That is, the periphery of the valve member is disposed upstream of the shaft on one side and down stream of the shaft on the other to allow use of a circumferentially continuous sealing member at the periphery of the valve member. The pivot shaft may transect the duct perpendicularly to the flow path, or be angulated relative to the latter. The valve taught by the '414 patent does not permit use of a circumferentially continuous sealing member on the valve member periphery.

In view of the deficiencies of the known butterfly valve art it is an object for this invention to reduce or eliminate the opposing torque which must be overcome to move the valve member of a butterfly valve from its closed to its open position.

Desirably, fluid pressure and flow forces acting on the plate-like butterfly valve member may be used to reduce or eliminate the opposing torque, or to effect pivotal movement of the valve member.

Still further, in view of the deficiencies of the valve taught by Illing in the '414 patent, it is desirable to be able to use a circumferentially continuous sealing member on the butterfly valve member.

Accordingly the present invention provides a duct, a plate-like butterfly valve member pivotally disposed in said duct and carried by a shaft member journaly on the latter and extending externally thereof to receive valve actuating torque, and means for relatively translating said valve member and shaft member along an action line generally perpendicular to the latter in response to rotation of said shaft member.

Accordingly the present invention provides a duct, a plate-like butterfly valve member pivotally disposed in said duct and carried by a shaft member journaled on the latter and extending externally thereof to receive valve actuating torque, and means for relatively translating said valve member and shaft member along an action line generally perpendicular to the latter in response to relative rotation therebetween.

An advantage of the present invention is that it allows use of a circumferentially continuous sealing member on the plate-like valve member of the butterfly valve.

BRIEF DESCRIPTION OF THE DRAWINGS

FIG. 3 provides a longitudinal cross-sectional view similar to FIG. 1, and showing parts of the butterfly valve in alternative operative positions;

FIG. 4 provides a schematic longitudinal cross-sectional view similar to FIG. 1, but depicting an alternative embodiment of the invention:

Figure 1:
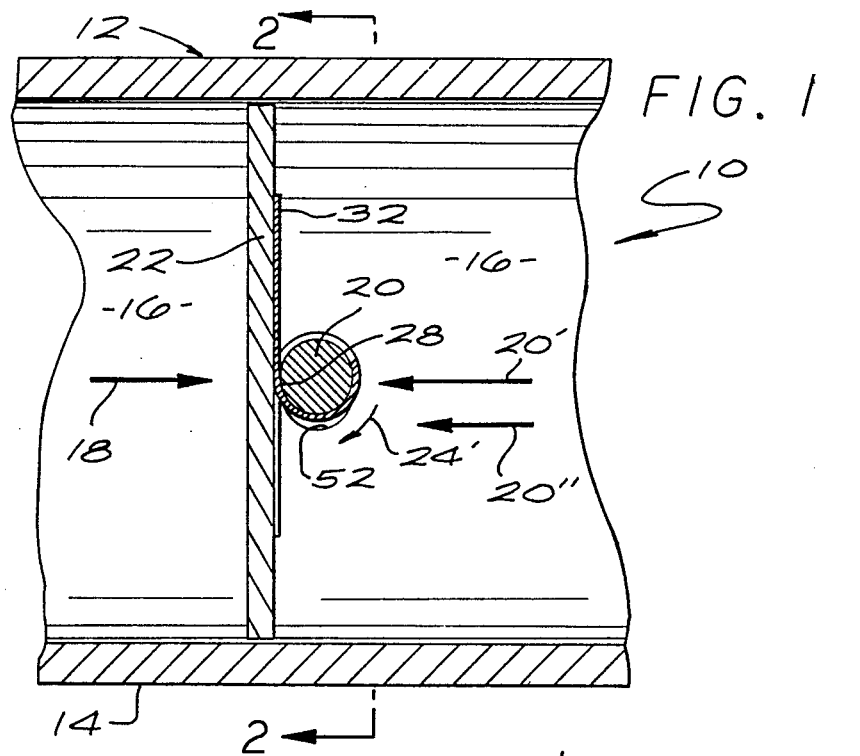
FIG. 1 provides a schematic longitudinal cross-sectional view of a butterfly valve according to one embodiment of the invention; and taken along line 1—1 of FIG. 2.
Figure 2:
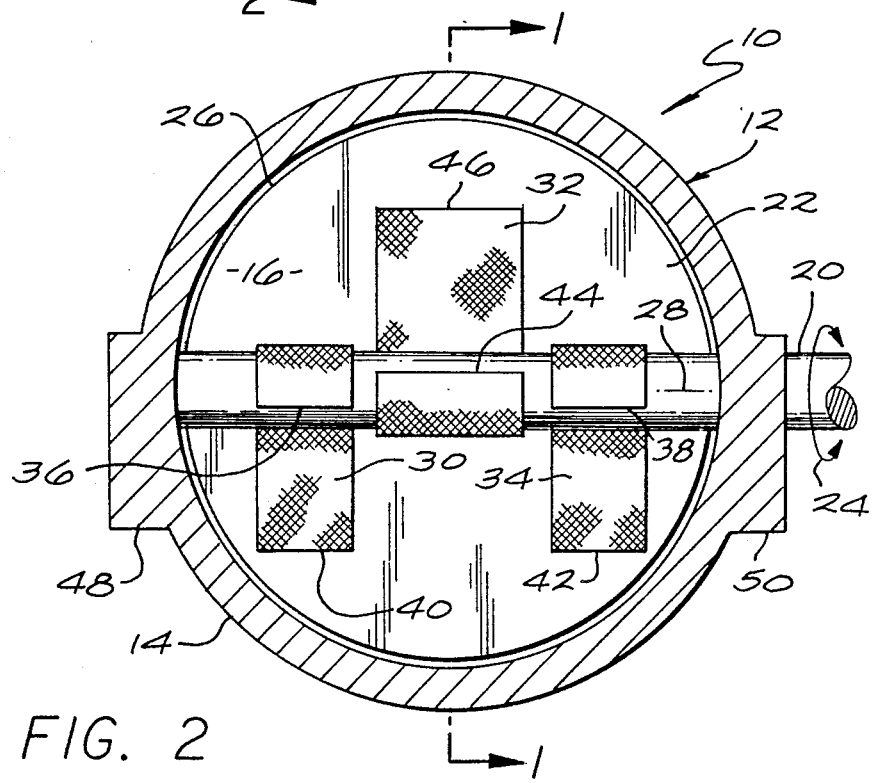
FIG. 2 depicts a transverse cross-sectional view of the butterfly valve of FIG. 1, and taken along line 2—2 of this latter Figure.

Viewing FIGS. 1 and 2 in conjunction, it will be seen that a butterfly valve apparatus 10 according to the present invention includes a duct 12 having an elongate circumferentially extending wall 14. The wall 14 bounds a flow path 16 wherein a flow of fluid, represented by arrow 18, is conveyed. A shaft 20 transects the duct 12 and supports therein a plate-like butterfly valve member 22. Shaft 20 and valve member 22 are intersecured for pivotal movement in unison. The shaft 20 is pivotally journaled by and is laterally movable relative to the duct 12, as will be more fully explained below. Shaft 20 also extends outwardly of the duct 12 to receive an actuating torque, generally represented by the arrow 24.

In a first, or closed, position of the plate-like valve member 22, the latter spans and closes the flow path 16, as is depicted in FIGS. 1 and 2. It will be noted that the plate-like valve member 22 provides a circumferentially continuous outer peripheral surface 26. This peripheral surface 26 in the first position of the valve member 22 cooperates with the wall 14 to substantially sealingly close fluid flow in flow path 16. Alternatively, the valve member 22 may carry a circumferentially extending sealing member at the surface 26 to sealingly cooperate with wall 14. These sealing members conventionally are of piston ring, o-ring, or lip seal configuration, as is well known to those skilled in the butterfly valve art.

It will be noted that in the first position of the plate-like valve member, the shaft 20 is centered in the duct 12. That is, the shaft centrally transects the flow path 16 so that an equal area of plate 22 is disposed on each side of the shaft 20 (above and below shaft 20, viewing FIG. 1). It is easily appreciated that in the closed position of the valve 22, static fluid pressure forces acting thereon are balanced at a medial line of support 28, defined at the supporting engagement between plate 22 and shaft 20. Thus, the fluid pressure forces acting on plate 22 may be considered to act at the center of the plate along the line of arrow 18. To support these fluid pressure forces, the shaft 20 provides a supporting force, which is represented by arrow 20', aligned with and opposite the arrow 18, and acting through the medial support line 28.

Viewing FIG. 2, it will be seen further that the plate 22 and shaft 20 are movably secured together by three lengths 30, 32, and 34, of flexible webbing. Two of the lengths of webbing 30 and 34, are secured at their one respective end, 36, 38, to the shaft 20 and wrap partially around the latter in a first direction between the shaft 20 and plate 22 to extend along the adjacent face of the latter. These lengths of webbing 30, 34 are secured to the plate 22 at their opposite ends 40, 42. On the other hand, the third length of webbing 32 is interposed between the lengths 30 and 34 and is secured to shaft 22 at its one end 44. The webbing 32 wraps around shaft 20 in a direction opposite to webs 30, 34, to pass between the shaft and plate 22, and extend along the adjacent face of the latter. At its end 46 the web 32 is secured to plate 22.

Further to the above, FIGS. 1 and 2 reveal that the wall 14 of duct 12 defines a pair of laterally elongate bosses 48, 50 whereat the shaft 20 is pivotally supported by the wall 14, viewing FIG. 2 particularly. The bosses 48, 50 each define one of a pair of transversely elongate slots 52, only one of which is visible viewing FIG. 1. The shaft 20 is sealingly received in the slots 52 for both pivotal and lateral translational movement relative to the duct 12.

In order to effect opening pivotal movement of the plate member 22, a clockwise actuating torque is applied to shaft 20, viewing FIG. 1, arrow 24'. This opening torque rolls the shaft 20 downwardly relative to plate 22, wrapping up the webs 30 and 34, while unwrapping web 32. Consequently, the shaft 20 moves downwardly in slots 52 so that the shaft and its supporting force arrow 20' no longer align with the medial line 28 and fluid pressure forces resolved at arrow 18. That is, the shaft 20 and its supporting force move downwardly relative to the plate 22 to an off-center position at the alignment of arrow 20''. The fluid pressure forces acting on plate 22 result in a clockwise torque which pivots plate 22 toward the position thereof depicted in FIG. 3.

As seen in FIG. 3, the plate-like valve member 22 is angularly disposed within the flow path 16 to allow fluid flow therein, as depicted by arrows 18. In overview, the angular position of the valve member 22 relative to the duct 12 and direction of fluid flow therein is selected by pivotal movement of the shaft 20 effected by actuating torque 24. At each pivotal position of the valve member 22, fluid dynamic flow forces acting thereon result in a force, represented by arrow 54, acting transversely thereto. The shaft 20 provides a support force, depicted by arrow 20', opposite to the force 54. The alignment of these forces relative to the slots 52 ensures that the shaft 20 remains in its lower, off-center, position. The angular position of the plate-like valve member 22 is determined by necessary alignment of the fluid dynamic flow forces (arrow 54) with the support force (arrow 20'). It is easily seen that arrow 54 is displaced from the medial line 28 of valve member 22 toward an upstream or leading wing 56 thereof, and away from a trailing or downstream wing 58. The position of the resultant force 54 changes with changing angular position of the valve member 22 in duct 12, but in every case the resultant force and support force must be aligned. Any misalignment of those forces causes the valve member 22 to seek a new angular position. Also, translation of the member 22 relative to shaft 20, which is depicted by arrow 60, may be effected either by rotation of the shaft 20, or by rocking of the valve member 22 about shaft 20 while the latter is stationary.

Carefully viewing FIG. 3, and recalling the wrapped relation of the webs 30-34 with shaft 20, it can be seen that clockwise rotation of the shaft 20, for example, translates valve member 22 rightwardly to misalign forces 54 and 20'. That is, force 54 is shifted generally to the right of force 20', and provides a clockwise torque to valve member 22 at the same time the size of wing 56 is decreased and wing 58 is increased. Thus, the valve member 22 pivots clockwise in response to the fluid dynamic forces to seek a new position once again aligning force 54 with support force 20'. Each angular position of the valve member 22 is determined by a rotational position of shaft 20, and is stable. For example, viewing FIG. 3, and considering shaft 20 as stationary, if the valve member 22 is perturbed clockwise toward a more open angular position, this movement rocks the plate-like valve member about shaft 20 to increase the size of leading wing 56 and decrease the size of wing 58. Consequently, the resulting fluid dynamic forces, arrow 54, are shifted leftwardly to result in a restoring moment on the valve member 22. Tests of a valve device embodying the invention as depicted in FIG. 1 have shown the angular position of the valve member to be related to pivotal position of shaft 20, to be stable, and to be almost completely free of rocking oscillation of plate member 22 about the shaft 20.

In order to close the valve device 10, shaft 20 is rotated counter clockwise from the position of FIG. 3 to progressively move the valve member 22 toward its position of FIG. 1. As the valve member 22 approaches its closed position, it contacts the wall 14 of the duct 12 so that further counter clockwise rotation of the shaft 20 rolls the shaft upwardly along the valve member 22. That is, the shaft 20 rolls along the valve member 22 to move upwardly in the slots 52 toward the position depicted in FIG. 1. Once again, the balanced static fluid pressure forces acting on the valve member 22, ensure its stable closed position transverse to duct 12, as depicted in FIG. 1.

Figure 5:
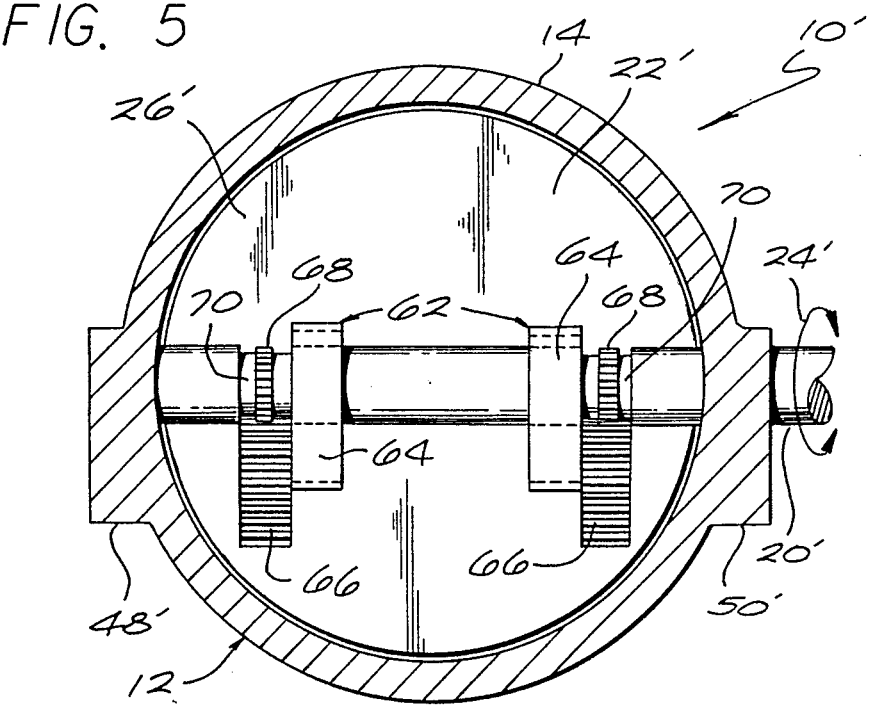
FIG. 5 depicts a transverse cross-sectional view similar to FIG. 2, and depicting the embodiment of FIG. 4 taken along the line 5—5 of this latter Figure.
Figure 6:
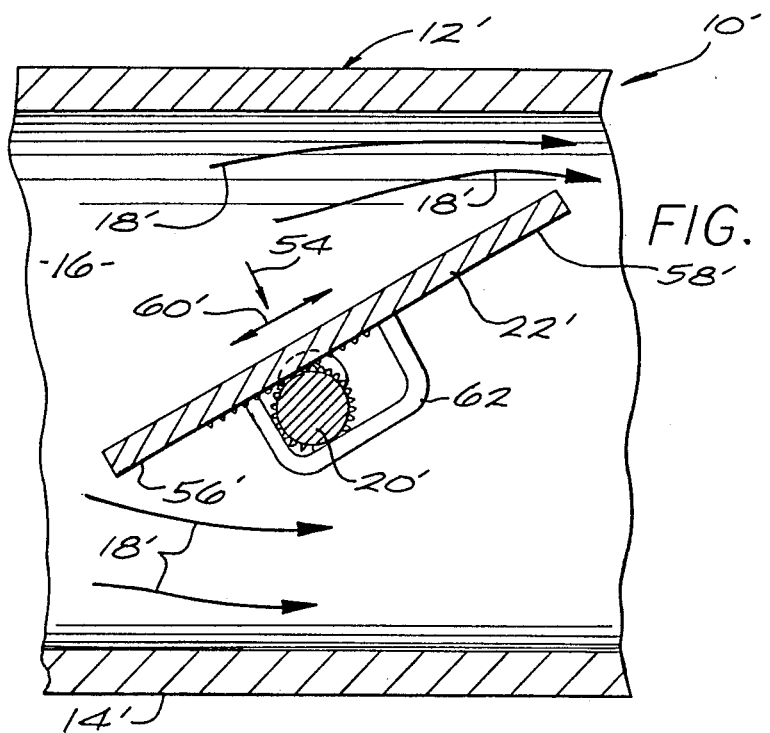
FIG. 6 provides a longitudinal cross-sectional view of the embodiment of FIG. 4 with parts thereof in alternative operative positions.

Turning now to FIGS. 4–6, an alternative embodiment of the invention is depicted. In order to obtain reference numerals for use on these drawing Figures, features which are analogous in structure or function to that depicted in FIGS. 1–3 are referenced with the same numeral used previously, but with a prime added. FIGS. 4–6 depict an alternative embodiment of the invention wherein the flexible webs 30–34 have been replaced by a pair of "rack-and-pinion with translating retainer" mechanisms, which are each generally referenced with the numeral 62.

The retainer portion of the mechanisms 62 includes a stirrup or bracket member 64 which is U-shaped and is secured at each of its ends to the valve member 22. The two brackets 64 encompass the shaft 20 to trap the latter in close proximity with the valve plate 22, while allowing relative translational movement therebetween. The valve plate 22 similarly carries or defines a pair of spaced apart gear racks 66. Meshing with the gear racks 66 are respective pinion gear members 68 carried by the shaft 20 within respective reduced-diameter shaft portions 70. The gear racks 66 are arranged so that the pitch line of the gear teeth is at the face of valve member 22 adjacent shaft 20. Similarly, the pitch circle of the pinions 68 is at the outer diameter of shaft 20. The resulting mesh of the gear racks 66 with pinion gears 68 allows rocking motion of valve member 22 about shaft 28 completely without slippage and substantially without friction. The bracket members 64 embrace the shaft 20 to ensure retention of the mesh relationship between the gear elements 66, 68. Also the provision of a pair of the mechanisms 62 spaced apart on the plate 22 and shaft 20 promotes precise guiding of the plate member 22 within duct 72.

Functioning of the embodiment depicted in FIGS. 4–6 is the same as that of FIGS. 1–3. In other words, the wrapped flexure members 30–34 of FIGS. 1–3 on the one hand provide translation of the valve plate 22 in response to rotating of shaft 20 with angulation of the valve plate held constant: and on the other hand also provide translation of the valve plate in response to rocking thereof about the shaft 20, with the rotational position of the shaft held constant. The "rack-and-pinion with translating retainer" mechanisms 62 of FIGS. 4–6 provide precisely the same kinematic relationship between valve plate 22 and shaft 20, while avoiding flexure of structural elements. That is, flexible web material is not required by the embodiment of FIGS. 4–6. Also, the rack and pinion mechanisms of FIGS. 4–6 may provide a more precise and rigid guiding of the valve plate 22 relative to shaft 20 and duct 12.

A significant feature of the present invention resides in the disassociation of fluid dynamic torques from acting on shaft 20. That is, an actuator provided to pivot shaft 20 need not sustain or overcome the fluid dynamic flow forces on the valve member and conventionally creating a strong closing torque. With the present invention, the actuator need only provide sufficient torque to translate the valve member 22 relative to shaft 20. In response, the fluid dynamic flow forces on the valve member 22 cause it to seek a new angular position aligning these flow forces, as resolved, with the support force of shaft 20. The necessary torque to translate valve member 22 relative to shaft 20 is but a small fraction of the torque required to actuate a conventional butterfly valve.

What is claimed is:

1. A butterfly valve apparatus having a duct, a plate-like butterfly valve member pivotally disposed in said duct, a shaft member journaled on the duct torque, and means for relatively translating said valve member and shaft member along an action line generally parallel with said valve member and perpendicular to a line parallel with said shaft member in response to relative rotation between said valve member and shaft incident to pivotal movement of the former or rotation of the latter.

2. The invention of claim 1 wherein said shaft member is movable laterally of said duct along a path generally perpendicular to said shaft between a first position wherein said shaft substantially bisects said duct and a second position spaced from said first position.

3. The invention of claim 2 wherein said translating means includes an elongate flexible member securing at one end thereof to said valve member and at least partially encircling said shaft member to secure at the other end thereto.

4. The invention of claim 3 wherein said translating means includes another flexible elongate member at one respective end thereof securing to said valve member and at least partially encircling said shaft member in a direction opposite said elongate flexible member and at an opposite end securing to said shaft member.

5. The invention of claim 4 wherein both said first-recited and said another flexible members interpose between said valve member and said shaft member.

6. The invention of claim 5 wherein said valve apparatus includes a first elongate flexible member and a pair of said another flexible elongate members disposed on opposite sides of said first flexible member.

7. The invention of claim 6 wherein said flexible members are of a fiberous web material.

8. The invention of claim 1 wherein a unidirectional flow of fluid is received in said duct, said plate-like valve member being disposed generally in an upstream position of said shaft member with respect to said fluid flow.

9. The invention of claim 1 wherein said translating means includes said shaft member carrying a pinion gear, said valve member carrying a rack gear meshing with said pinion gear, and retaining means for permitting relative pivotal movement of said valve member and shaft member as well as said relative translation along said action line while retaining meshing engagement of said pinion gear and rack gear.

10. The invention of claim 9 wherein said retaining means includes a generally U-shaped member securing at its opposite ends to said valve member and enveloping said shaft member to trap the latter in proximity to said valve member.

11. Butterfly valve apparatus comprising a duct having a circumferential wall defining an axially extending fluid flow path, a rotational actuating shaft member transecting said duct and extending externally thereof to receive valve actuating torque applied thereto, said shaft member journaling on said duct and being laterally movable relatively thereto along a movement path generally perpendicular to said shaft member between a first position substantially bisecting said duct and a second position spaced from said first position, a plate-like butterfly valve member disposed in said duct and resting in pivotal supporting relation upon said shaft member generally along a medial line of said plate member to define a pair of opposite butterfly valve member wing portions of variable area, said valve member being pivotally movable between a first position transverse to and closing said duct and wherein said wing portions are of substantially equal area and a second position non-transverse or substantially parallel with said duct to open fluid communication therethrough and wherein one of said pair of wing portions exceeds the area of the other of said pair of wing portions, and coacting translating means for in response to rotation of said shaft member by actuating torque on the one hand translating said shaft member relative to both said valve member and duct to the second position of said shaft member when said valve member is in said first position thereof and on the other hand translating said valve member relative to said shaft member when said valve member is in the second position thereof, whereby lateral movement of said shaft member to said second position thereof with said valve member in said first position thereof unbalances said wing portions to pivot said butterfly valve member from said first position to said second position in response to fluid pressure forces effective thereon, and rotation of said shaft member with said valve member in said second position translates the latter relative to said shaft member to vary the areas of said wing portions and pivot said valve member in response of equilibration of fluid forces effective thereon.

12. The invention of claim 11 wherein said coacting translating means includes a first and an opposite pair of second flexible members all securing at one end thereof to said valve member with said first member securing to one of said pair of wing portions thereof and said pair of members securing to the other of said pair of wing portions, all of said flexible members interposing between said valve member and said shaft member and at least partially encircling the latter to secure thereto at respective other ends thereof, said first flexible member wrapping about said shaft member in a respective first direction while said pair of second flexible member wrap about said shaft member in the opposite direction, said pair of flexible members being spaced apart laterally of said duct and said first flexible member interposing between said pair of second flexible members.

13. The invention of claim 12 wherein said flexible members are of fiberous web material.

14. The invention of claim 11 wherein said coacting translating means includes said shaft member carrying a pair of spaced apart equal pinion gear members; said valve member carrying a pair of spaced apart rack gear members each meshing with a respective one of said pair of pinion gear members, and said valve member also carrying retaining means pivotally and relatively translationally securing the latter to said shaft member.

15. The invention of claim 14 wherein said retaining means includes a generally U-shaped member securing at respective opposite ends to said valve member and embracing said shaft member to permit relative pivotal and translational motion while retaining meshing engagement of said pair of pinion gear members with said pair of rack gear members.

16. A method of controlling a flow of fluid comprising the steps of:
conveying said fluid flow through a duct;
transecting said duct with a rotational shaft extending outwardly thereof for receiving an operating torque applied thereto;
disposing a plate-like valve member in said duct for pivoting between a first position transverse to and closing said duct and a second position non-transverse or substantially parallel with said duct for permitting fluid flow therein, and
linking said valve member with said shaft member via translating means for translating said valve member and said shaft member relative to one another along an action line generally parallel with said plate-like valve member and perpendicular to a line parallel with said shaft member in response to relative rotation.

17. The method of claim 16 wherein linking said valve member with said shaft member via said translating means includes the steps of: securing at least a pair of elongate flexible members at respective first ends thereof to said shaft member, wrapping each of said at least a pair of flexible members about said shaft member in respective opposite directions to at least partially encompass said shaft member, interposing each of said at least a pair of flexible members between said shaft member and said plate member to be upon an adjacent face of the latter and extend from said shaft member in opposite directions, and securing said at least a pair of flexible members to said valve member at respective second ends thereof disposed on opposite sides of said shaft members.

18. The method of claim 16 wherein linking said valve member with said shaft member via said translating means includes the steps of: providing a spaced apart pair of equal pinion gear members carried by said shaft member coaxially therewith, providing a pair of spaced apart gear rack members carried upon said valve member, meshing each of said pair of said pinion gear members with a respective one of said pair of gear rack members, and providing retaining means for allowing relative pivotal and translational motion between said valve member and said shaft member while retaining meshing engagement of said gear members.

19. The method of claim 18 wherein providing said retaining means includes the steps of providing a generally U-shaped member, securing to a face of said valve member said U-shaped member at the ends thereof, and disposing said shaft member adjacent said valve member face and within said U-shaped member.

20. The method of claim 16 further including the steps of providing for movement of said shaft member laterally of said duct along a movement path generally perpendicular to said shaft member.

21. A butterfly valve apparatus including a duct, a plate-like butterfly valve member pivotally disposed in said duct for movement between a first transverse position closing the duct and a second relatively angulated position allowing fluid flow in said duct, a shaft member journaled on the duct and extending externally thereof for rotatably receiving an actuating torque, and kinematic means interconnecting said valve member and shaft for translating the former in response to rotation of the latter with valve member angulation held constant and also translating the former in response to change of angulation thereof with rotational position of said shaft held constant.

22. The invention of claim 21 wherein said shaft member is movable laterally of said duct in response to movement of said valve member between said first and said second positions.

23. In a butterfly valve which includes a duct defining a flow path wherein may be conveyed a flow of fluid, a plate-like valve member pivotally disposed within said duct for pivotal movement about a transverse axis to open and close the duct, said transverse pivot axis dividing said valve member into a pair of wing portions disposed on opposite sides of said pivot axis, a method comprising the steps of: translating the valve member relative to the pivot axis along an action line substantially parallel with the former and perpendicular to a line paralleling said pivot axis in response to pivotal movement of said valve member;

utilizing said translation to effect a reduction in area of one of said pair of valve member wings and commensurate increase in area of the other of said pair of valve member wings; and employing the change in area of said pair of valve member wings to alter the net fluid dynamic torque effected by fluid flow within said duct upon said member.

* * * * *